(12) United States Patent  (10) Patent No.: US 7,063,364 B2
Bird et al.  (45) Date of Patent: Jun. 20, 2006

(54) BUMPER ARRANGEMENT

(75) Inventors: James Bird, Oak Ridge, NC (US); Karl Duckett, Greensboro, NC (US)

(73) Assignee: Volvo Trucks North America, Inc., Greensboro, NC (US)

(*) Notice: Subject to any disclaimer, the term of this patent is extended or adjusted under 35 U.S.C. 154(b) by 0 days.

(21) Appl. No.: 10/773,978

(22) Filed: Feb. 6, 2004

(65) Prior Publication Data

US 2004/0183318 A1 Sep. 23, 2004

Related U.S. Application Data

(60) Provisional application No. 60/453,464, filed on Mar. 10, 2003.

(51) Int. Cl.
  *B60R 19/38* (2006.01)

(52) U.S. Cl. .............. 293/154; 293/155; 293/118; 293/149

(58) Field of Classification Search .......... 293/118, 293/132, 114, 119, 149–154, 102, 155
See application file for complete search history.

(56) References Cited

U.S. PATENT DOCUMENTS

| 996,207 | A | | 6/1911 | Brown et al. |
| 1,224,817 | A | | 5/1917 | Westover |
| 1,375,244 | A | | 4/1921 | Whitney |
| 1,584,081 | A | | 5/1926 | Douglass |
| 1,627,317 | A | | 5/1927 | Cox |
| 1,651,005 | A | | 11/1927 | Veale |
| 1,661,786 | A | | 3/1928 | Bullard, Jr. |
| 1,705,119 | A | | 3/1929 | Jacobs |
| 1,717,855 | A | | 6/1929 | Schleiff |
| 1,723,832 | A | | 8/1929 | Yanss |
| 2,672,363 | A | * | 3/1954 | Hugh ............... 293/118 |
| 2,896,735 | A | | 7/1959 | Bohn |
| 2,954,256 | A | | 9/1960 | Barenyi |
| 3,005,657 | A | * | 10/1961 | Brooks ............. 296/37.2 |
| 3,451,710 | A | * | 6/1969 | Savell ................ 293/118 |
| 3,596,963 | A | | 8/1971 | Phillips |
| 3,820,834 | A | | 6/1974 | Wilfert et al. |
| 3,830,539 | A | | 8/1974 | Yoshie et al. |
| 3,842,180 | A | | 10/1974 | Alexander |
| 3,907,352 | A | * | 9/1975 | Spain et al. ......... 293/152 |
| 3,924,888 | A | | 12/1975 | Butcher et al. |
| 4,099,759 | A | | 7/1978 | Kornhauser |
| 4,225,167 | A | | 9/1980 | Buettner et al. |
| 4,251,096 | A | | 2/1981 | Stock |
| 4,391,464 | A | | 7/1983 | Masotti et al. |
| 4,422,680 | A | | 12/1983 | Goupy |
| 4,746,263 | A | * | 5/1988 | Cook ................ 414/543 |

(Continued)

FOREIGN PATENT DOCUMENTS

JP  404024141 A * 1/1992 ............ 293/116

*Primary Examiner*—D. Glenn Dayoan
*Assistant Examiner*—Greg Blankenship
(74) *Attorney, Agent, or Firm*—Martin Farrell

(57) ABSTRACT

A moveable bumper arrangement. The moveable bumper arrangement includes an elongated bumper member, an end bumper member, and a mechanism coupled to the end bumper member. The mechanism allows substantially translational movement of the end bumper member with respect to the elongated bumper member from a first position where the end bumper member is positioned at an end of the elongated bumper member to a second position where the end bumper member is spaced apart from the elongated bumper member.

30 Claims, 9 Drawing Sheets

U.S. PATENT DOCUMENTS

| | | |
|---|---|---|
| 4,783,104 A | 11/1988 | Watanabe et al. |
| 4,811,979 A | 3/1989 | Peter et al. |
| 4,838,593 A | 6/1989 | Fleming et al. |
| 4,895,405 A | 1/1990 | Sasatake et al. |
| 4,972,913 A | 11/1990 | Ray et al. |
| 5,000,499 A | 3/1991 | Shephard et al. |
| 5,022,692 A | 6/1991 | Horansky et al. |
| 5,042,858 A * | 8/1991 | Schubert et al. ............. 293/24 |
| 5,498,044 A | 3/1996 | Bovellan et al. |
| 5,566,777 A | 10/1996 | Trommer et al. |
| 5,577,784 A | 11/1996 | Nelson |
| 5,678,872 A * | 10/1997 | Slater ....................... 293/118 |
| 5,711,561 A * | 1/1998 | Boysen ...................... 293/116 |
| 5,882,054 A | 3/1999 | Devilliers et al. |
| 5,967,573 A * | 10/1999 | Wang ........................ 293/119 |
| 6,082,811 A | 7/2000 | Yoshida |
| 6,092,959 A * | 7/2000 | Leonhardt et al. ............ 404/6 |
| 6,135,517 A | 10/2000 | Cordebar |
| 6,203,079 B1 * | 3/2001 | Breed ........................ 293/119 |
| 6,209,935 B1 | 4/2001 | Kavc et al. |
| 6,224,120 B1 * | 5/2001 | Eipper et al. ............... 293/118 |
| 6,290,272 B1 | 9/2001 | Braun |
| 6,371,540 B1 | 4/2002 | Campanella et al. |
| 6,371,541 B1 | 4/2002 | Pedersen |
| 6,435,578 B1 * | 8/2002 | Li ............................. 293/134 |
| 6,575,509 B1 * | 6/2003 | Golden ...................... 293/119 |
| 6,764,118 B1 * | 7/2004 | DePottey et al. ........... 293/118 |
| 6,767,039 B1 * | 7/2004 | Bird .......................... 293/154 |
| 6,866,284 B1 * | 3/2005 | Carlsson .................... 280/474 |
| 6,926,322 B1 * | 8/2005 | Browne et al. ............. 293/114 |
| 2001/0024043 A1 * | 3/2001 | Breed ........................ 293/119 |

* cited by examiner

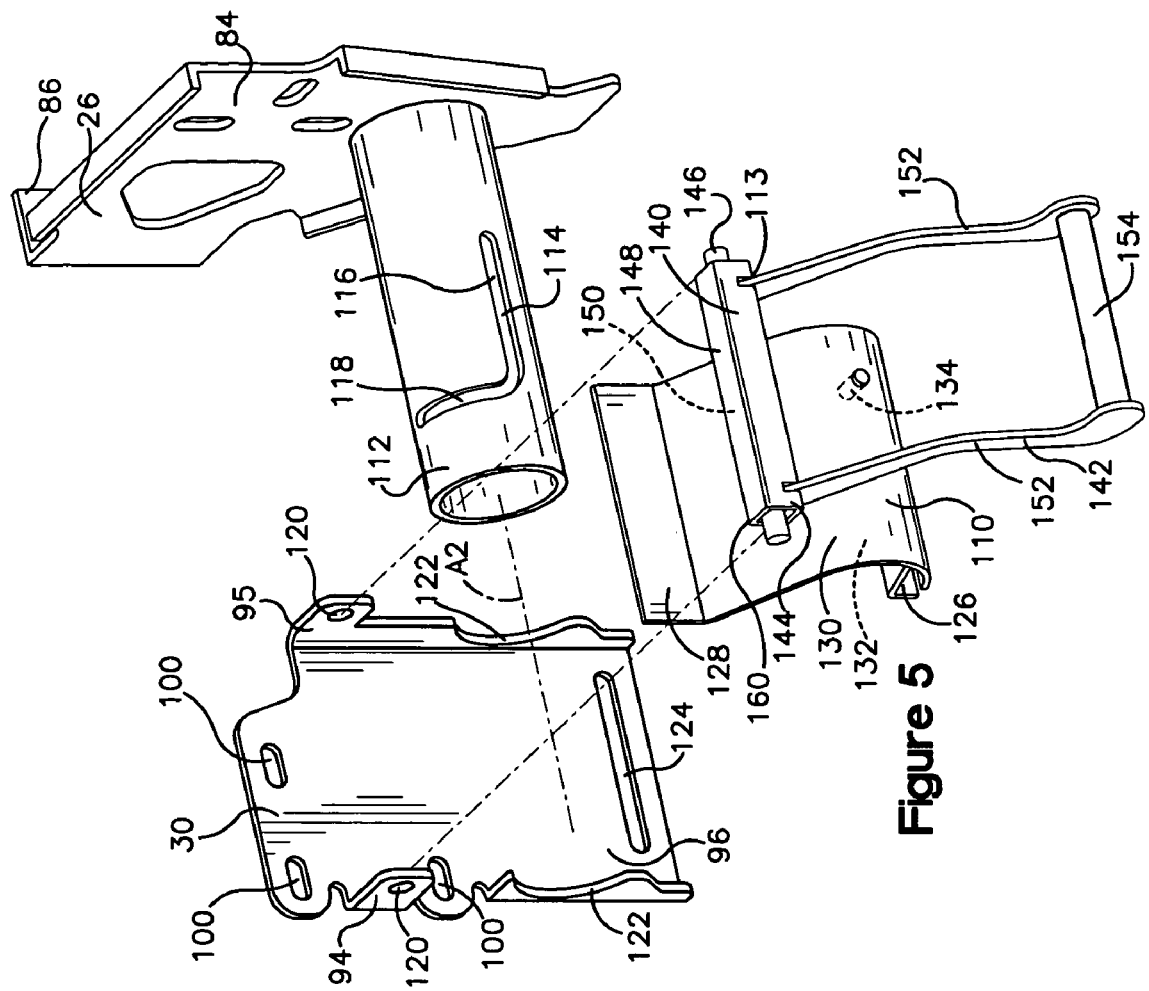
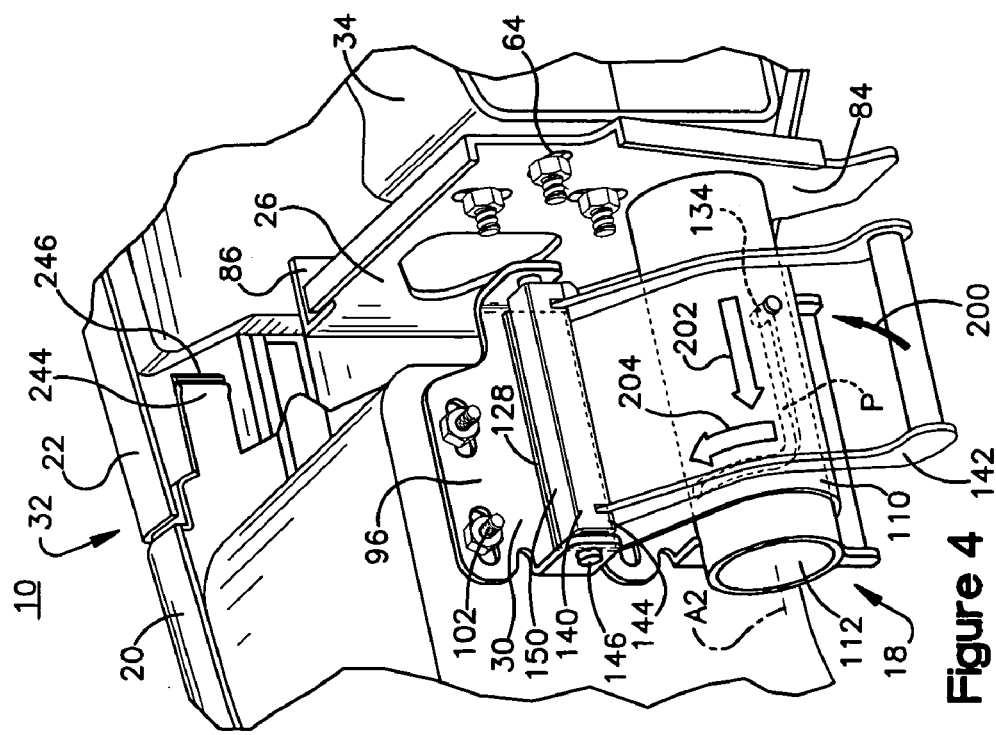

BUMPER ARRANGEMENT

This application claims the benefits of Provisional Application No. 60/453,464, filed Mar. 10, 2003.

FIELD OF THE INVENTION

The present invention relates generally to a bumper arrangement for an over-the-highway truck or tractor vehicle. In particular, the present invention relates to a bumper arrangement wherein a bumper member connected to the vehicle is selectively movable to allow easier access for maintenance and/or repair.

BACKGROUND OF THE INVENTION

Existing bumper assemblies for over the highway trucks or tractors include an elongated center member and a pair of end members or end caps. Typically, the end members are fixedly fastened to the center member.

Many trucks and tractors include a cab positioned rearward of an engine and a hood positioned over the engine. The hood can be rotated about a pivot axis to access the engine for service and/or repair. The end bumper members of typical trucks and tractors are not movable without removing the fasteners that fix the end bumper members to the center bumper member or fix the end bumper to the vehicle frame.

A divided bumper arrangement has been proposed that includes two spaced apart outer sections. Each outer section is rotatably connected to the vehicle. When the vehicle is on a level surface, each outer section can be rotated an axis that is substantially vertical.

Bumper arrangements have been developed for cab over engine type trucks where a first bumper arrangement is attached to a pivotable nose hood. A second bumper arrangement positioned behind the first bumper arrangement is maintained in a fixed position and is unconnected with the first bumper arrangement. The first bumper arrangement pivots with the nose hood when the nose hood is pivoted to an open position, while the second bumper arrangement remains in its fixed position.

There is a need for a bumper arrangement wherein a bumper member connected to the vehicle is movable to allow easier access for maintenance and/or repair.

SUMMARY OF THE INVENTION

The present invention relates to a moveable bumper arrangement. The moveable bumper arrangement includes an elongated bumper member, an end bumper member, and a mechanism coupled to the end bumper member. The mechanism allows substantially translational movement of the end bumper member with respect to the elongated bumper member from a first position where the end bumper member is positioned at an end of the elongated bumper member to a second position where the end bumper member is spaced apart from the elongated bumper member.

In one embodiment, the mechanism allows the end bumper member to be rotated with respect to the elongated bumper member when the end bumper member is spaced apart from the elongated bumper member. The elongated bumper member and the end bumper member may be connected by a detachable connection in the first position and movement to the second position detaches the detachable connection, allowing the end bumper member to rotate with respect to the elongated bumper member. In one embodiment, the end bumper member is both rotatable and linearly movable with respect to the elongated bumper member once the end bumper member is detached from the elongated bumper member.

In one embodiment, the detachable connection includes latching projections extending from the end bumper member and latching recesses in the elongated bumper member that accept the latching projections. The end bumper member is latched to the elongated bumper member when the latching projections are latched to the latching recesses.

The moveable bumper arrangement is suitable for use on a motor vehicle, such as an over the highway truck. When used on a vehicle, a mechanism is attached to a vehicle component, such as a vehicle frame or a component supported by the vehicle frame. A bumper member, such as an end bumper member, is connected to the vehicle component by the mechanism. The mechanism allows substantially translational movement of the bumper member with respect to the vehicle component along a portion of a path of travel allowed by the mechanism. In one embodiment, the vehicle includes a hood that is separately movable from the bumper member. In one embodiment, an axis of rotation of the bumper member is substantially parallel to an axis of a vehicle wheel.

In one embodiment, the mechanism includes a first mechanism member that cooperates with a second mechanism member such that the first mechanism member is rotatable and linearly movable with respect to the second mechanism member. The first and second mechanism members may include cooperating arcuate surfaces.

In one embodiment, a pin extends from the first mechanism member and a slot is defined in the second mechanism member. In this embodiment, movement of the pin in the slot defines the path of travel of the bumper member. For example, the slot may be formed to allow the end bumper member to first be pulled away from the center bumper member and then be rotated relative to the center bumper member.

In one embodiment, a clamp arrangement is included for clamping the bumper member in the normal position. The clamp arrangement prevents relative movement of the first and second mechanism members. A handle may be included to release the clamp arrangement to allow movement of the mechanism.

When the moveable bumper arrangement is used, the first bumper member is pulled away from the second bumper member. The first bumper member is then rotated with respect to the second bumper member. When a detachable connection is included, the pulling of the first bumper member away from the second bumper member detaches the first bumper member from the second bumper member. In one embodiment, once the first and second bumper members are separated, the first bumper member can be rotated and/or translated with respect to the second bumper member.

Additional features of the invention will become apparent and a fuller understanding will be obtained by reading the following detailed description in connection with the accompanying drawings.

BRIEF DESCRIPTION OF THE DRAWINGS

FIG. 4 is an enlarged partial perspective view showing a portion of the view of FIG. 3;

FIG. 5 is an exploded perspective view of components shown in FIG. 4;

DETAILED DESCRIPTION OF THE INVENTION

Figure 1:
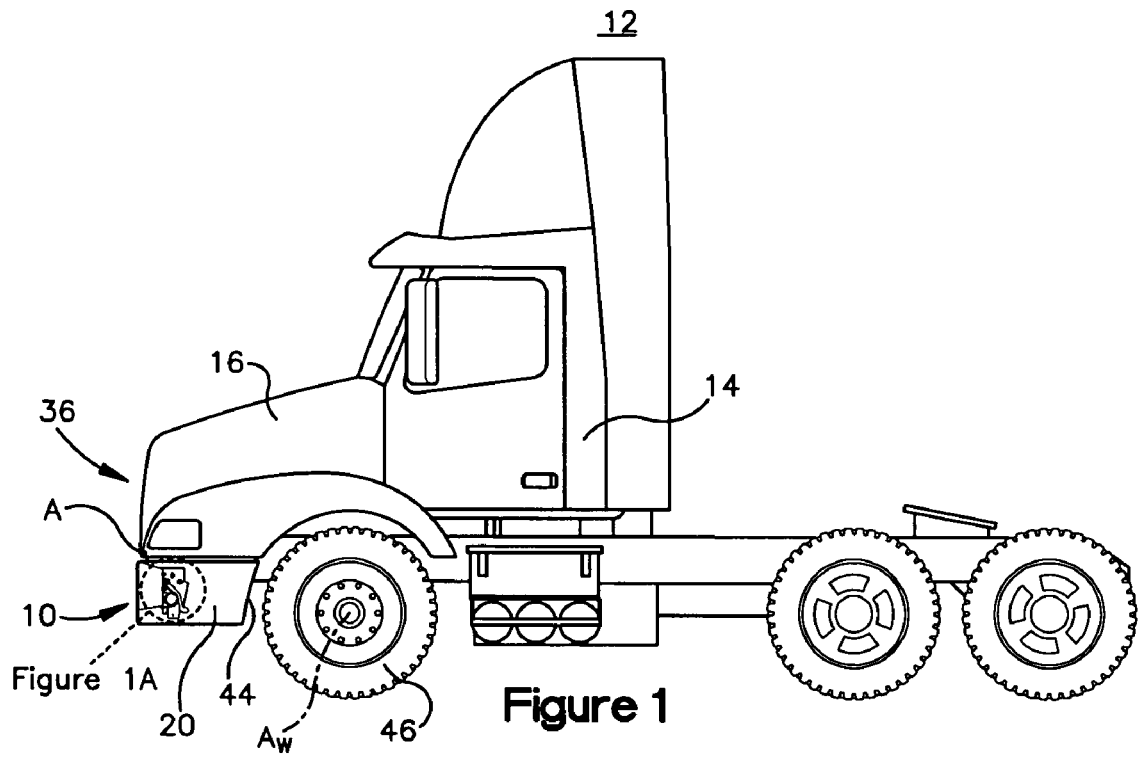
FIG. 1 is a side elevational view of an over the highway tractor having a bumper arrangement embodying one embodiment of the present invention.
Figure 3:
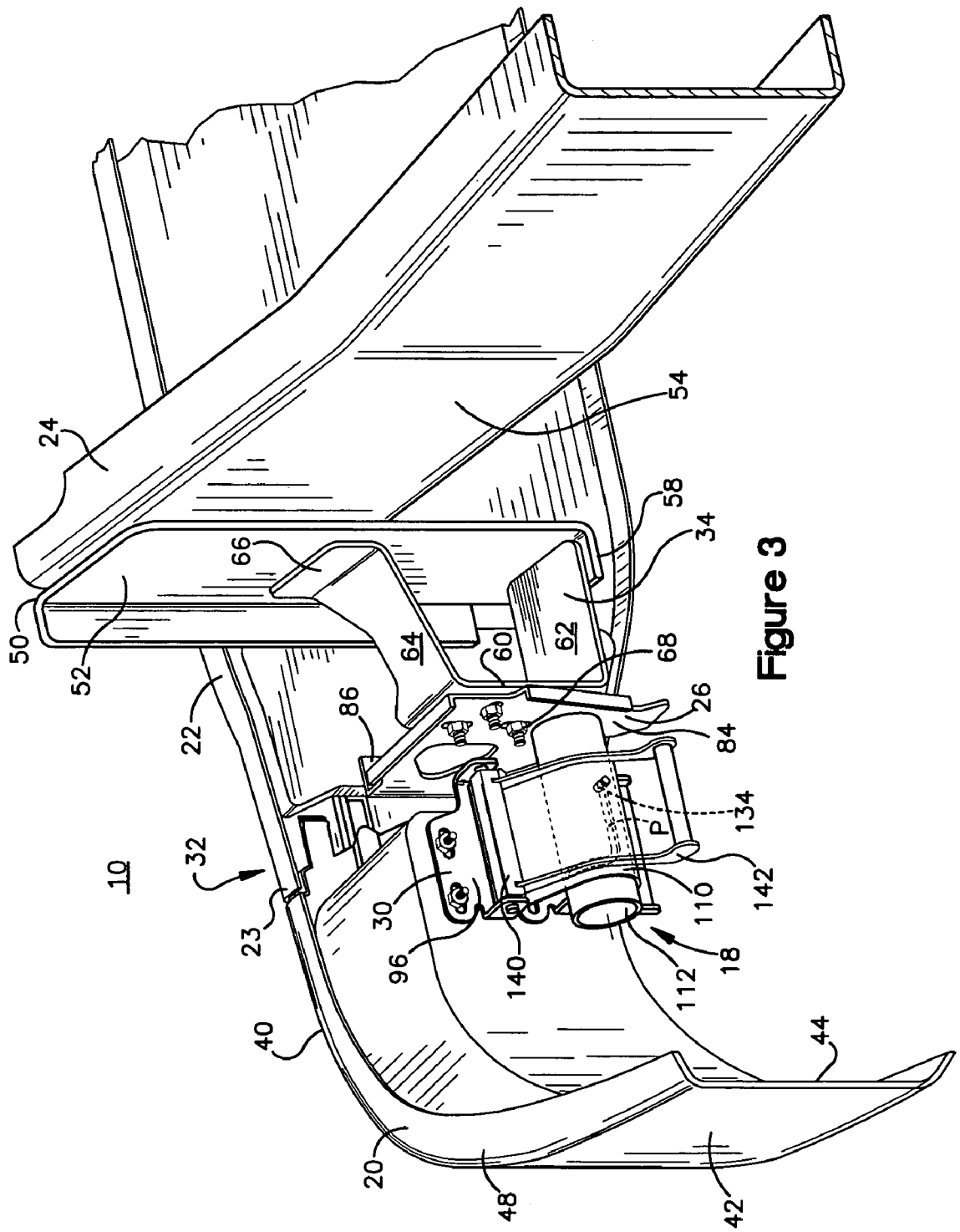
FIG. 3 is a partial perspective view of one embodiment of the bumper arrangement of the present invention.
Figure 9:
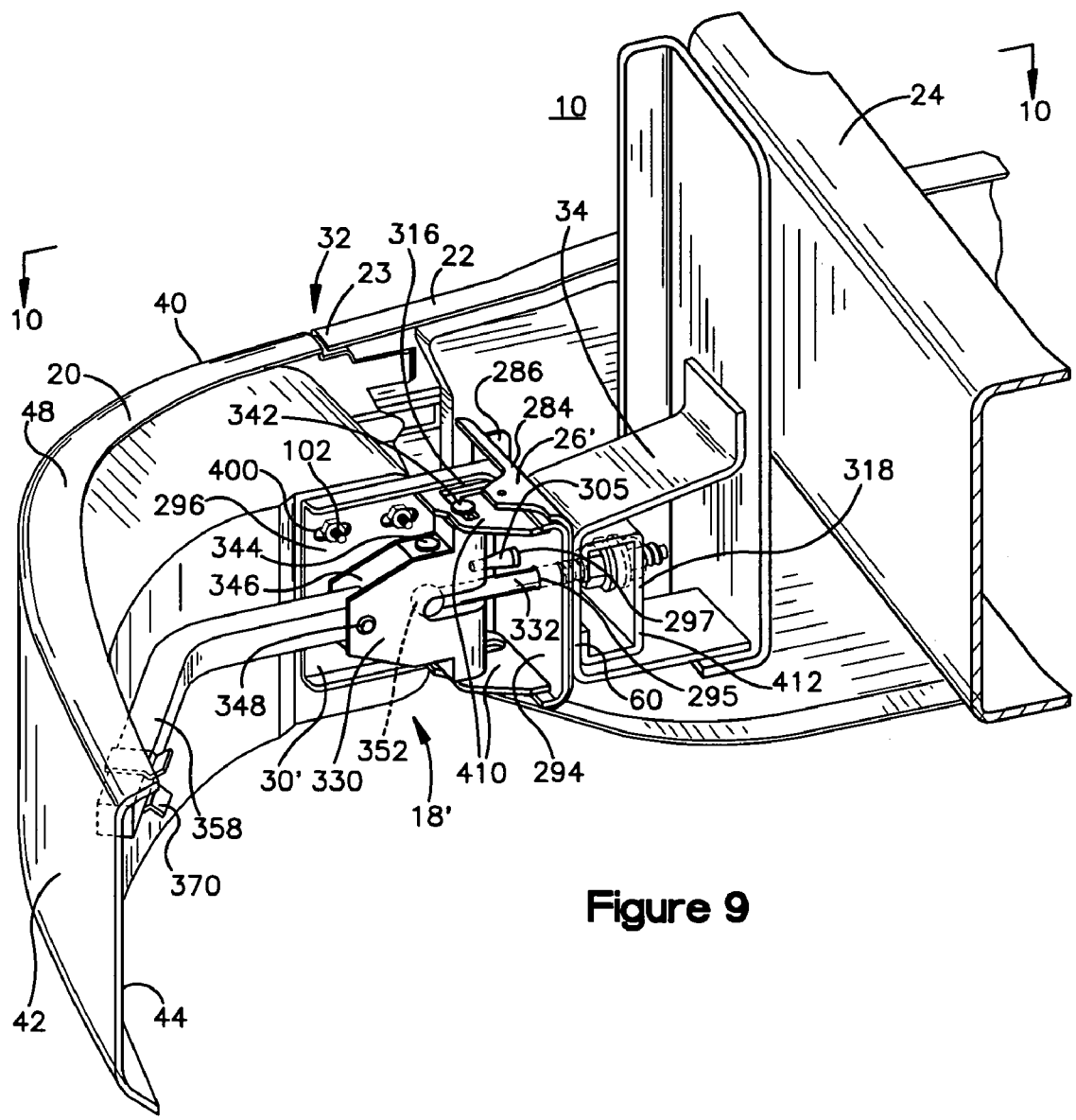
FIG. 9 is a partial perspective view of a bumper arrangement of a second embodiment of the present invention.

Referring to FIGS. 1,3 and 9, the present disclosure is directed to a moveable bumper arrangement 10. Referring to FIGS. 3 and 9, the moveable bumper arrangement 10 includes an elongated center bumper member 22, a moveable end bumper member 20, and a mechanism 18 coupled to the end bumper member 20. The mechanism 18 allows substantially translational movement of the end bumper member 20 with respect to the elongated bumper member 22. This allows the end bumper member to be pulled from a first position, illustrated by FIGS. 3 and 9, where the end bumper member is positioned at an end 23 of the elongated center bumper member 22 to a second position, illustrated by FIGS. 12 and 13, where the end bumper member 20 is spaced apart from the elongated bumper member 22.

Figure 2:
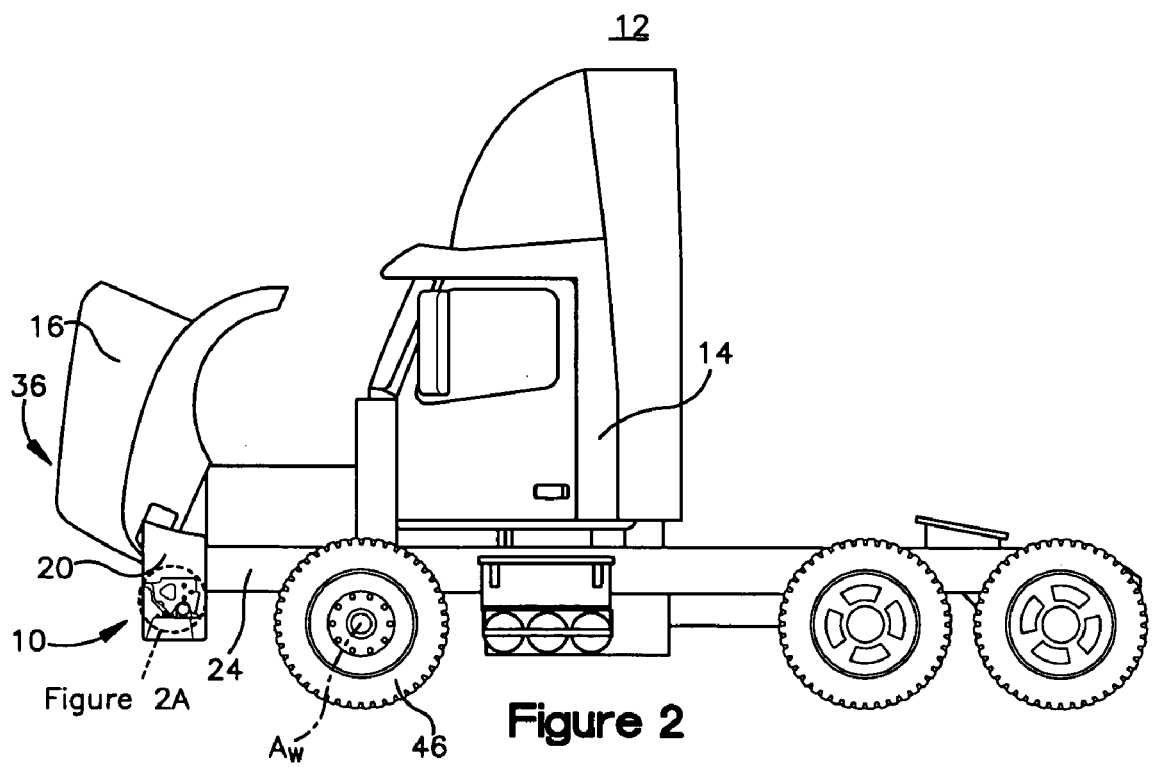
FIG. 2 is the over the highway tractor shown in FIG. 1 with a hood in an open position and a bumper member in a position that allows easier access for maintenance and/or repair.
Figure 15:
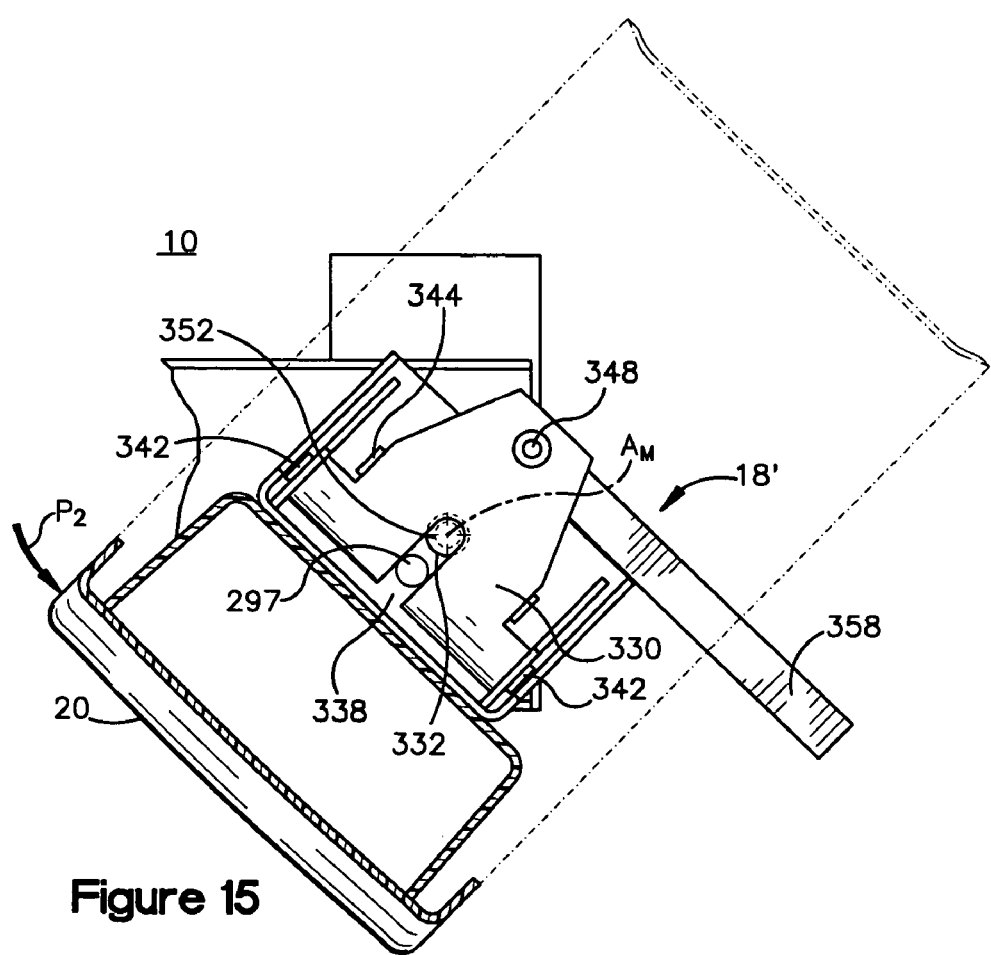
FIG. 15 is a view similar to the view of FIG. 14 showing rotation of an end bumper member with respect to a center bumper member.

Referring to FIGS. 2 and 15, the illustrated mechanisms 18 allows the end bumper member 20 to be rotated with respect to the elongated bumper member 22 once the end bumper member 20 is pulled apart from the elongated bumper member 22.

Referring to FIG. 1, the moveable bumper arrangement 10 is suitable for use on a motor vehicle. The illustrated vehicle is a tractor 12 having a cab 14 and a hood 16. The illustrated hood 16 is pivotally connected to the cab, allowing the hood to rotate about an axis A between closed (FIG. 1) and open (FIG. 2) positions. In the illustrated embodiment, the hood 16 is separately movable from the end bumper member 22. Referring to FIGS. 3 and 9, the mechanism 18 is supported by a vehicle frame 24. For example, the mechanism 18 could be connected to the center bumper member. The end bumper members 20 are connected to the vehicle 12 by the mechanism 18 such that the end bumper members 20 are selectively movable with respect to the center bumper member 22 along a path of travel P allowed by the mechanism 18.

Referring to FIGS. 3 and 9, the end bumper members 20 cap the ends 23 of elongated center bumper member 20 when in the normal position. The center bumper member 22 is fixedly connected to the vehicle 12. In the illustrated embodiments, the center bumper member 22 is mounted to a frame member 24 by an inner bracket 26 and the end bumper members 20 are supported by an outer bracket 30. In the exemplary embodiment, the end bumper members 20 are connected to the center bumper member by a detachable connection 32. In the illustrated embodiments, the connection 18 allows the end bumper members to be detached from the center bumper member 22 by allowing substantially translational movement of the end bumper member when the end bumper member is pulled apart from the center bumper member 22. Once detached from the center bumper member, the end bumper members are moveable to positions that facilitate repair or maintenance of the vehicle.

In the embodiments illustrated by FIGS. 3 and 9, the inner and outer brackets 26, 30 are connected to the frame member 24 by a chassis bracket 34. The center and end bumper members are mounted at a front end 36 of the vehicle 12. One center bumper member and two end bumper members are included. In the Figures, only one end bumper member 20 and one end 23 of the center bumper member are shown. In one embodiment, a second moveable end bumper member 20 is included at the second end of the center bumper member. In this embodiment,the second end bumper member and the second end of the center bumper member are substantially mirror images of illustrated end bumper member and the illustrated end of the center bumper member. In another embodiment, only one moveable end bumper member 20 is included. In this embodiment, the moveable end bumper member 20 may be disposed at either end of the center bumper member. A non-moveable end bumper member (not shown) is disposed at the opposite end of the center bumper member in this embodiment. In the illustrated embodiments, the end bumper members and the center bumper member are constructed from plastic. One or more of the bumper members may be made from a metal, such as steel or aluminum, or may be made from carbon fiber or any other suitable material.

Referring to FIGS. 3 and 9, the illustrated end bumper member 20 includes a front portion 40 and a side portion 42. In the illustrated embodiments, the front portion 40 is aligned with or is somewhat in front of the vehicle. The front portion 40 could be recessed with respect to the front of the vehicle. In the illustrated embodiment, the side portion 42 is aligned with or somewhat outward of the vehicle. The side portion 42 could be inward of the vehicle. An end 44 of the end bumper section is normally located in front of a front tire 46 (FIG. 1). The front and side portions 40, 42 are connected by a curved portion 48.

Figure 6:
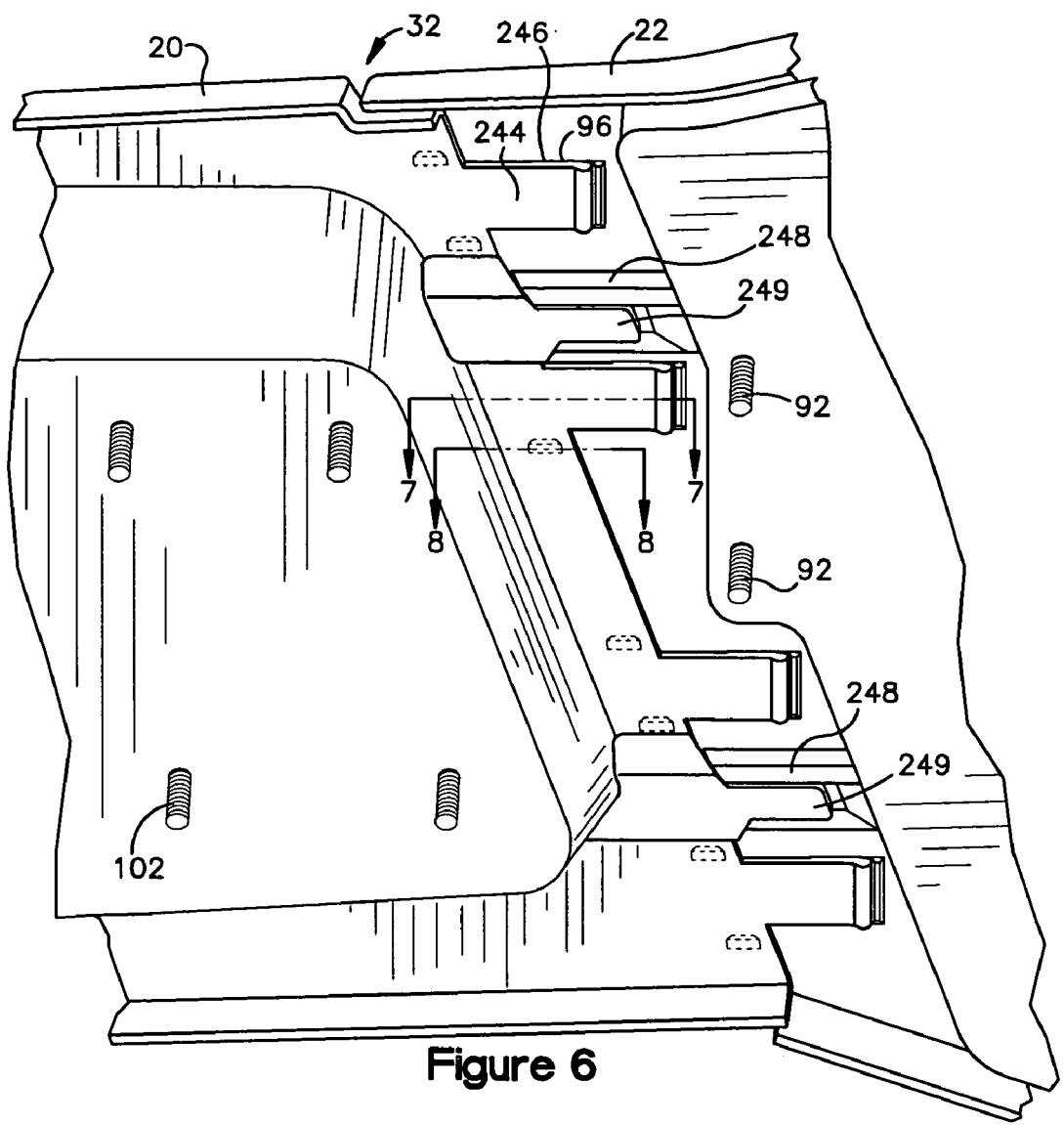
FIG. 6 is a partial perspective view of a detachable connection of a first bumper section to a second bumper section.
Figure 7:
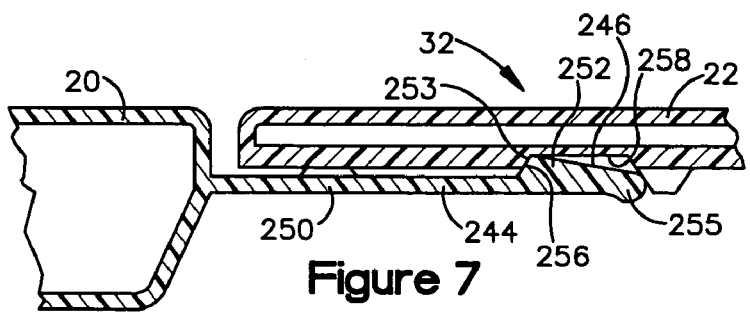
FIG. 7 is a sectional view taken along the plane indicated by lines 7—7 of FIG. 6.
Figure 8:
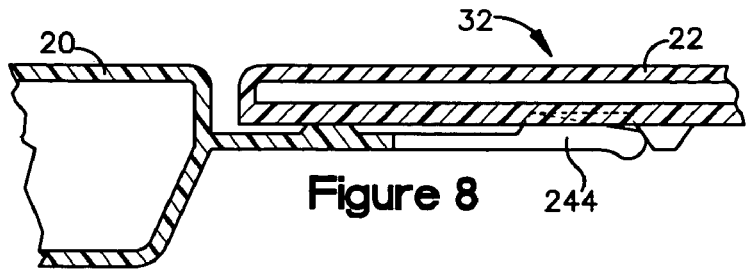
FIG. 8 is a sectional view taken along the plane indicated by lines 8—8 of FIG. 6.

The center bumper member 22 extends between the two end bumper members 20. Referring to FIGS. 6–8, each end of the center bumper section is connected to an end bumper member 20 by a detachable connection 32 in the exemplary embodiment.

FIG. 3 shows how the chassis bracket is coupled to the frame 24 in the exemplary embodiments. A frame bracket 50 is connected to the frame 24 by welding, fasteners or by other means generally known in the art. The frame bracket is made from steel in the exemplary embodiment. In the illustrated embodiment, the frame bracket extends below the frame to position the bumper sections below the frame 24. It should be readily apparent to those skilled in the art that the bumper assembly could also be aligned with the frame or could be positioned above the frame. The frame bracket 50 includes a panel 52 that is generally parallel to a side surface 54 of the illustrated frame member 24. A lower flange 58 extends from the panel 52 toward the end bumper member.

Referring to FIG. 3, the chassis bracket 34 is connected to the frame bracket 50 in the illustrated embodiments. The illustrated chassis bracket 34 includes a mounting portion 60, a lower leg 62, an upper leg 64 and a flange 66. The mounting portion 60 is a generally flat plate that facilitates attachment of the inner bracket 26. The mounting portion 60 includes holes (not shown) for attachment of the inner bracket with fasteners 68. The lower leg 62 extends from the mounting portion 60 to the lower flange of the frame bracket 50. The lower leg 62 is connected to the lower flange 58. The upper leg 64 extends from the mounting portion 60 to the frame bracket 50. In the illustrated embodiment, the upper leg extends upward from the mounting portion 60 to the frame bracket. The flange 66 abuts and is connected to the panel 52 to connect the upper leg 64 to frame bracket 50.

FIGS. 3 and 4 and illustrate a first embodiment of the bumper arrangement 10 that includes a moveable bumper member 20 that can be moved with respect to the vehicle so that a vehicle component 61 can be serviced more easily. Examples of components that may be serviced more easily when the end bumper member is moved include engine components, brake components, suspension components, wheel components, etc. In the embodiment illustrated by FIGS. 1A, 2A, and 3–5, the inner bracket 26 includes a first flange 84 and a second flange 86. The first flange 84 abuts the mounting portion 60 of the chassis bracket 34. The first flange includes holes or slots 61 that are aligned with the holes in the chassis bracket. The second flange 86 or mounting flange extends from the first flange 84 toward the frame member 24 in the illustrated embodiment. The second flange includes mounting holes (not shown) or slots. Studs 92 (FIG. 6) that are included in the center bumper section and extend through the holes and secure the center bumper section to the inner bracket. It should be readily apparent to those skilled in the art that any type of fastener could be used to secure the center bumper section to the inner bracket.

Referring to FIG. 5, the outer bracket 30 in the first illustrated embodiment is a substantially "U" shaped bracket that includes a first flange 94 and a second flange 95 that extend from a mounting plate 96. The mounting plate 96 includes mounting holes or slots 100. In the exemplary embodiment, studs 102 that are included in the end bumper section and extend through the holes 100 are used to secure the end bumper section to the outer bracket. It should be readily apparent to those skilled in the art that any type of fastener could be used to secure the end bumper section to the outer bracket.

FIGS. 1A, 2A and 3–5 illustrate a mechanism 18 of the first embodiment that can be used in accordance with the present invention. The mechanism 18 illustrated by FIGS. 1A, 2A, and 3–5 connects the outer bracket 30 to the inner bracket 26 such that the outer bracket is selectively movable with respect to the inner bracket. The illustrated mechanism allows the outer bracket 30, and thus the moveable end bumper member 20 to be pulled to detach and space apart the end bumper 20 member from the center bumper member 22 and then be rotated relative to the rest of the vehicle.

Referring to FIGS. 1, 3 and 4, the end bumper member 20 is rotatable about an axis $A_2$ (FIGS. 3 and 4) that is generally parallel to a vehicle wheel axis $A_w$ (FIG. 1)

In the embodiment illustrated by FIGS. 1A, 2A, and 3–5, the mechanism 18 includes a first member 110 or locking bracket connected to the outer bracket 30 and a second member 112 or tube connected to the inner bracket. The locking bracket 110 cooperates with the tube 112 such that locking bracket 110 is rotatable and linearly movable along the axis of the tube 112. The mechanism 18 illustrated in the embodiment of FIGS. 1A, 2A, and 3–5 also includes a clamp member 113 for fixing and releasing the mechanism 18.

Referring to FIG. 5, the illustrated tube 112 is a cylindrical tube having a round cross-section. The tube 112 extends generally orthogonally from the inner mounting bracket 26. In the exemplary embodiment, the tube 112 is fixed to the inner mounting bracket 26 by welding. A guide slot 114 is defined in the tube. The illustrated guide slot includes a first portion 116 that extends along the length of the tube such that the first portion is substantially parallel to the axis A2 of the tube and a second portion 118 that extends around the circumference of the tube such that the second portion is substantially perpendicular to the axis A2. The guide slot could alternatively be shaped to form a different path to define the desired motion of the end bumper member 20.

In the embodiment illustrated in FIG. 5, the outer mounting bracket 30 is formed to accept the tube 112, the locking bracket 110, and the clamp member 113. The first and second flanges 94, 95 of the outer bracket support the tube 112 and the clamp member 113. The flanges 94, 95 include holes 120 used to support the clamp member. The flanges 94, 95 also include arcuate cutouts 122. The arcuate cutouts 122 are sized to accept the tube 112. In the embodiment illustrated by FIGS. 1A, 2A, and 3–5, the diameter of the cutouts 122 is slightly larger than the diameter of the tube 112 allowing the tube to slide in the cutouts when not clamped down. A slot 124 is defined in the mounting plate 96 for connecting the locking bracket 110 to the outer mounting bracket 30.

The locking bracket 110 includes a first and second flanges 126, 128 connected by a curved or bent portion 130. The first flange 126 fits in the slot 124 to movably connect the locking bracket 110 to the outer bracket. The curved or bent portion 130 is disposed around the tube 112. An arcuate interior surface 132 acts as a clamping surface that engages the tube 112. The surface 132 has approximately the same diameter or is slightly larger than the tube 112. When the first flange 126 is in the slot 124 and the arcuate surface 132 is around the tube 112, the second flange 128 is spaced away from the mounting flange 96 unless pressure is applied to the second flange 128. When pressure is applied to the second flange 128, the surface 132 engages the tube 112 and presses the portions of the tube in the cutouts 122 against the flanges 94, 95 to clamp the tube 112 to the outer bracket 30. As a result, the position of the outer bracket 30 is fixed with respect to the inner bracket 26 when pressure is applied to the second flange 128.

A pin 134 is disposed in the curved or bent portion 130. The illustrated pin 134 extends radially inward of the arcuate surface 132. The pin 132 extends into the guide slot 114 of the tube 112. Movement of the locking bracket 110, and thus the outer bracket 30, is defined by the movement of the pin 134 in the slot 114. In the embodiment illustrated in FIGS. 1A, 2A, and 3–5, the pin and slot allow the outer bracket to be pulled linearly outward with respect to the end bumper member as the pin travels in the first portion 116 of the slot 114 and to be rotated with respect to the end bumper member as the pin travels in the second portion 118 of the slot. Translational movement of the end bumper member 22 as the pin travels in the first portion 116 of the slot and separates the end bumper member 20 from the center bumper member. The end bumper member 22 is rotated as the pin 118 travels in the second portion 118 of the slot.

The clamp member 113 is movable between a clamped position (FIG. 1A solid lines) that clamps the mechanism 18, and thus the end bumper member 20, in a fixed position and a released position (FIG. 1A phantom lines and FIG. 2A) that releases the mechanism 18 to allow movement of the end bumper member with respect to the center bumper member. The clamp member illustrated in FIGS. 1A, 2A, and 3–5 includes a cam member 140 and a handle 142. The cam member 140 includes a rectangular member 144 and a pin or pins 146 connected to the rectangular member 144. The pin(s) 146 extend from the rectangular member 144 into the holes 120 in the flanges 95, 96 of the outer bracket 30 to rotatably connect the clamp member 113 to the outer bracket 30. The center of the pin(s) 146 is offset from the center of the rectangular member 144 such that the pin(s) 146 are closer to the surface 148 than the pin(s) are to the surface 150 (see FIGS. 1A and 2A).

The handle 142 includes a pair of spaced apart lever arms 152 and a gripping member 154. The spaced apart arms are connected to the clamp member 113 and the gripping member 154. Movement of the gripping member 154 causes the clamp member 113 to rotate about the axis of the pin(s) 146 between the released position and the clamped position.

Figure 2A:
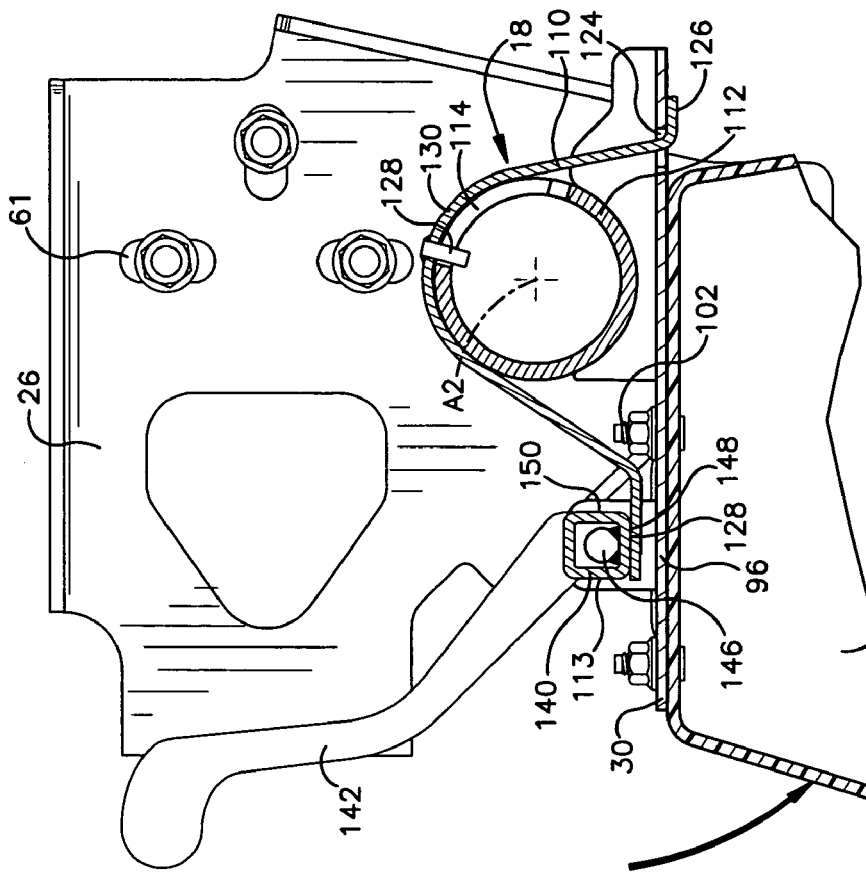
FIG. 2A is a partial view as indicated by section 2A in FIG. 2.

Referring to FIG. 2A, in the released position the gripping member is elevated and the surface 148 of the clamp member 113 is in engagement with the second flange 128 of the locking bracket 110. Since the distance between the pin(s) 146 and the surface 148 is relatively small, substantial pressure is not applied to the second flange 128 by the clamp member. As a result, the clamp member 113, the outer bracket 30, the locking member 110, and the end bumper member 20 are movable along the path of travel P defined by the pin and slot in the released position.

In the embodiments illustrated by FIGS. 1A, 2A, and 3–5, the mechanism defines the path of travel to include two end positions. The first end position or normal position(illustrated by FIGS. 1, 3,4, and 6) corresponds to the normal operating position of the bumper member during driving, in which the end bumper member is positioned at the end of the center bumper member. At the second end position, the end bumper member is separated from the center bumper member and has been rotated with respect to the center bumper member. At the second end position, components normally shielded by the bumper are accessible. In the example illustrated by FIGS. 2 and 2A, the end bumper member 20 is in an upright position, in which the bumper member extends in an inclined position in relation to a horizontal plane (shown as vertical) at the second end position.

Figure 1A:
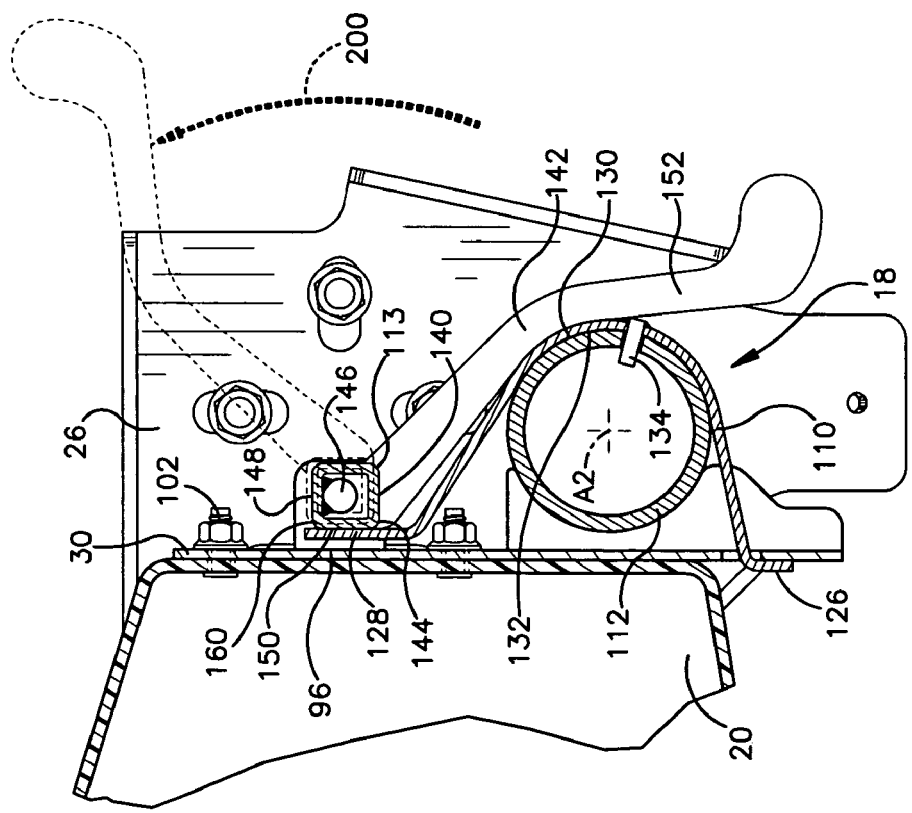
FIG. 1A is a partial view as indicated by section 1A in FIG. 1.

Referring to FIG. 1A, in the clamped position the lever arms 152 are positioned adjacent to the locking member 110. The surface 150 of the clamp member 113 is in engagement with the second flange 128 of the locking bracket 110. Since the distance between the pin(s) 146 and the surface 150 is relatively large, substantial pressure is applied to the second flange 128 by the clamp member. As a result, the locking bracket 110 is fixed to the tube 112, thereby inhibiting movement of the outer bracket 30 and the bumper member 20. Force must be applied to the handle to move the clamp member 113 from the clamped position to the released position. The distance between the pin(s) and a corner 160 is greater than the distance between the pin(s) and the surface 150. As a result, additional force is required to rotate the corner 160 past the flange 128 to bring the surface 148 into engagement with the flange 128. In addition, the frictional force between the surface 150 and the flange 128 inhibit movement of the handle from the clamped position to the released position without action by a user.

FIGS. 9–15 illustrate a moveable bumper arrangement 10 of a second embodiment. In the bumper arrangement illustrated by FIGS. 9–15 substantially translational movement of the bumper member 20 is permitted as indicated by arrow $P_1$ (FIG. 13), allowing the end bumper 20 member to be separated from the center bumper member 22. Once the end bumper member 20 is separated from the center bumper member 22, both translational movement as indicated by arrow $P_1$ (FIG. 13) and rotational movement as indicated by arrow $P_2$ (FIG. 15) are permitted. Referring to FIGS. 1, 9 and 15 the end bumper member is rotatable about an axis $A_m$ (FIGS. 9 and 15) that is generally parallel to a vehicle wheel axis $A_w$ (FIG. 1).

In the embodiment illustrated by FIGS. 9–15, the inner bracket 26' includes a main flange 284, and a bumper attachment flange 286 extending from the main flange. The main flange 284 abuts the mounting portion 60 of the chassis bracket 34. The main flange is secured to the chassis bracket by fasteners (not shown) that extend through aligned holes or slots in the main flange and the chassis bracket in the exemplary embodiment. In the illustrated embodiment, a guide pin 305 is connected to the chassis bracket 34. The guide pin 305 extends through an opening in the main flange 284 of the inner bracket. It should be readily apparent that the guide pin could be connected directly to the inner bracket. The bumper attachment flange 286 extends from the main flange 284 toward the frame member 24 in the illustrated embodiment. The attachment flange includes mounting holes or slots (not shown). Studs 92 (FIG. 6) included in the center bumper section extend through the attachment flange 286 to secure the center bumper section to the inner bracket.

Figure 10:
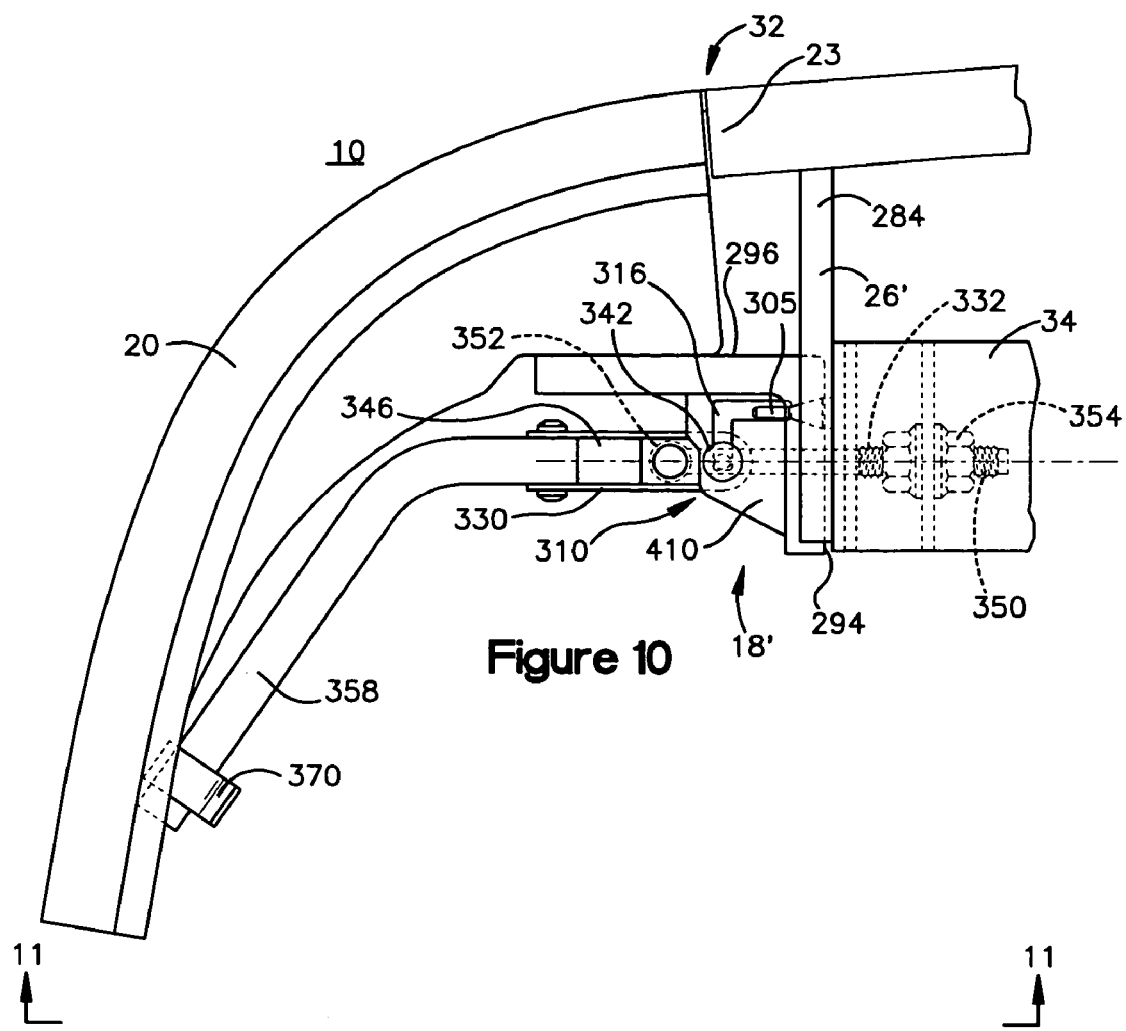
FIG. 10 is a view taken along the plane indicated by lines 10—10 of FIG. 9.

Referring to FIGS. 9 and 10, the outer bracket 30' in the second illustrated embodiment is a substantially "L" shaped bracket that includes a first flange 294 and a mounting flange 296. The first flange 294 includes a connecting rod clearance hole 295 that a connecting rod extends through and a guide pin hole 297 that accepts the guide pin 305. Cooperation of the guide pin 305 and the guide pin hole 297 ensure that the outer bracket 30' is correctly oriented with respect to the inner bracket 26' in a normal position (see FIG. 14). The mounting flange 296 includes mounting holes or slots 400. In the exemplary embodiment, studs 102 are included in the end bumper section and extend through the slots 400 to secure the end bumper section to the outer bracket.

FIGS. 9–15 illustrate a mechanism 18' of the second embodiment that can be used in accordance with the present invention. The mechanism 18' illustrated by FIGS. 9–15 connects outer bracket 30' to the inner bracket 26 such that the outer bracket is selectively movable with respect to the inner bracket. The illustrated mechanism allows the moveable bumper member 20 to be detached from the fixed bumper member 22, and to be pulled outward and rotated relative to the rest of the vehicle to provide better access to components of the vehicle. In the embodiment illustrated by FIGS. 9–15, the mechanism 18' includes a pair of path defining plates 410 connected to the outer bracket 30', a biasing member 412 connected to the inner bracket 26', and a linkage 310 that couples the path defining plates and the biasing member. The linkage 310 cooperates with the path defining plates 410 and the biasing member 412 such that outer bracket 30' can move linearly and rotate with respect to the inner bracket 26'.

Referring to FIG. 9, the pair of path defining plates 410 are connected to the outer bracket 30' in a fixed spaced apart relationship. It should be readily apparent that the path defining plates and the outer bracket 30' could be formed as a single piece. Each plate includes a track defining cutout 316. The track defining cutouts 316 in the pair of path defining plates 410 are aligned.

Figure 11:
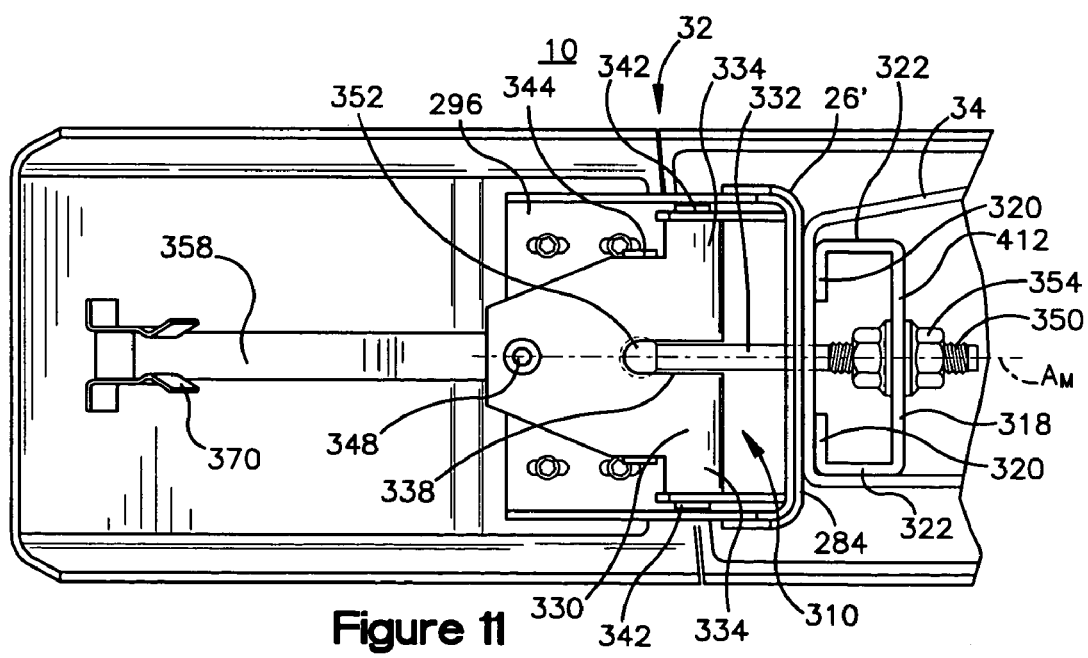
FIG. 11 is a view taken along the plane indicted by lines 11—11 of FIG. 10.

Referring to FIG. 11, the biasing member 412 includes a linkage connecting wall 318, and a pair of chassis bracket abutting walls 320 spaced apart from the linkage connecting wall 318 by a pair of walls 322. The chassis bracket abutting walls 320 are connected to the chassis bracket 34 in a conventional manner. The linkage connecting wall 318 includes an opening for connection of the linkage 310. The spaced relationship of the linkage connecting wall 318 with respect to the chassis bracket allows the linkage connecting wall to flex inward as force is applied by the linkage 310.

The linkage 310 includes a track following member 330, and a connecting rod 332. Referring to FIG. 11, the track following member 330 includes a pair of spaced apart pin holding structures 334. A pair of track cutout following pins 342 extend through the track defining cutouts 316 and are secured in the pin holding structures 334 to couple the track following member 330 to the path defining plates 410. The pin connection of the following member 330 to the path defining plates allows the pins 342 to move along the path defined by the cutouts 316 and allows the track following member 330 to rotate about the axis defined by the pins 342. Referring to FIG. 11, a channel 338 is defined between the pin holding structures. A bore extends through the following member 330 into communication with the channel. The bore accepts a connecting rod pin 344 that extends across the channel 338. A handle channel 346 is disposed in the track following member 330. A bore extends through the following member 330 into communication with the channel 346. The bore accepts a handle pin 348 that extends across the channel 346.

The illustrated connecting rod 332 is an elongated member that includes a threaded end portion 350 and a pin connection end portion 352. The threaded end portion 350 is rotatably coupled to the linkage connecting wall 318 of the biasing member. In the embodiment illustrated by FIGS. 9–15, a pair of nuts 354 secure the threaded end portion 350 to the linkage connecting wall 318 such that the connecting rod 332 and the nuts 354 are rotatable with respect to the biasing member. The pin connection end portion 352 extends into the channel 338 and is connected to the following member by the connecting rod pin 344. The pin connection end portion 352 is rotatable with respect to the following member about the axis defined by connecting rod pin 344. The connecting rod 332 extends from the following member 330, through an opening in the outer bracket 30', through an opening in the inner bracket 26', through an opening in the chassis bracket, between the abutting walls 320, to the linkage connecting wall 318.

In the embodiment illustrated by FIGS. 9–15, a handle 358 is included for moving the following member 330, the pair of path defining plates 410, the outer bracket 30', and the end bumper member. The handle is an elongated member that generally conforms to an inner surface of the end bumper member. In the exemplary embodiment, a latch 370 is included in or attached to the end bumper member for supporting and/or securing the handle in a resting or normal position (see FIG. 9). One end of the handle includes a bore that is disposed in the handle channel 346 of the track following member 330. The handle pin 348 extends through the handle bore to couple the handle 358 to the track following member. The handle is rotatable with respect to the track following member about an axis defined by the handle pin 348.

The mechanisms 18 illustrated by the Figures are only two of many arrangements that could be used to connect an end bumper member to a vehicle such that the bumper member is movable to allow easier access for maintenance and/or repair of vehicle components. For example, any mechanism that selectively allows the end bumper member to be moved with respect to center bumper member 22 along a path of travel defined by the mechanism while the bumper member is still attached to the vehicle could be used without departing from the spirit or scope of the present invention.

FIGS. 6–8 illustrate a detachable connection 32 of the exemplary embodiment. The illustrated detachable connection comprises a plurality of latching projections 244 and a plurality of corresponding latching recesses 246. In the illustrated embodiment, the latching projections 244 extend from the end bumper member 20 and the latching recesses 246 are formed in the center bumper member. In alternate embodiments, the latching projections 244 may extend from the center bumper member and the latching recesses 246 may be formed in the end bumper member or the some of the latching projections 244 may extend from each of the end bumper member and the center bumper member and corresponding latching recesses are formed in the center and end bumper sections.

Each latching recess accepts a latching projection. The end bumper member 20 is latched to the center bumper member when the latching projections are latched in the latching recesses.

The latching projections and latching recesses align the end bumper member with respect to the center bumper member in all three directions. The spacing between the center bumper section and the end bumper section, the alignment of the fronts of the bumper sections, and the alignment of the tops and bottoms of the bumper sections are maintained by the latching projections and latching recesses.

In the illustrated embodiment, the center bumper member includes two pairs of guiding projections 248. The end bumper member includes two guiding fingers 249. These guiding fingers 249 do not include a latching mechanism in the illustrated embodiment. One guiding projection is located adjacent to each side of each guiding finger 249. The guiding projections 248 and guiding fingers 249 guide the latching projections 244 into the latching recesses 246 during assembly of the end bumper members to the center bumper member.

FIG. 8 is a sectional view showing a latching projection 244 latched in a latching recess 246. The latching projection includes an elongated portion 250 and a projection or tongue 252. The tongue 252 includes an inclined surface 253 that extends away from the elongated portion 250 and toward an end 255 of the latching projection, forming an obtuse angle between the surface 253 and the elongated portion 250. The illustrated latching recess 246 is a concavity having an inclined wall 256. An obtuse angle is formed between the inclined wall 256 and an inner surface 258 of the recess 246. Further details of a detachable connection that can be used in accordance with the present invention are disclosed in U.S. patent application Ser. No. 10/219,404, entitled "Bumper Assembly," filed on Aug. 15, 2002, which is incorporated herein by reference.

The bumper arrangement 10 allows easier access to vehicle components needing service and repair. The user may also rotate the hood 16 about its axis A to an open position (shown in FIG. 2) to further facilitate access to components needing service and repair. In the embodiment illustrated by FIGS. 1A, 2A, and 3–5, the user pulls upon the gripping member 154 as indicated by arrow 200 to rotate the clamp member 113 to the released position. Next, the end bumper member 20 is pulled apart from the center bumper member as indicated by arrow 202 releasing the latching projections 244 from the latching recesses 246, thereby disconnecting the end bumper member 20 from the center bumper member 22. The end bumper member is moved further outward and then rotated (as indicated by arrow 204) along the path of travel defined by the mechanism 18 to place the end bumper member in a position that allows easier access to vehicle components.

To replace the end bumper member in its normal use position, end bumper member is rotated and then pushed inward along the path of travel defined by the mechanism 18. The end bumper member 20 is pushed further inward to latch the latching projections 244 to the latching recesses 246, to reconnect the end bumper member 20 to the center bumper member 22. Finally, the user pushes down on the gripping member 154 to rotate the clamp member 113 to the clamped position to clamp the end bumper member in its normal use position.

Figure 12:
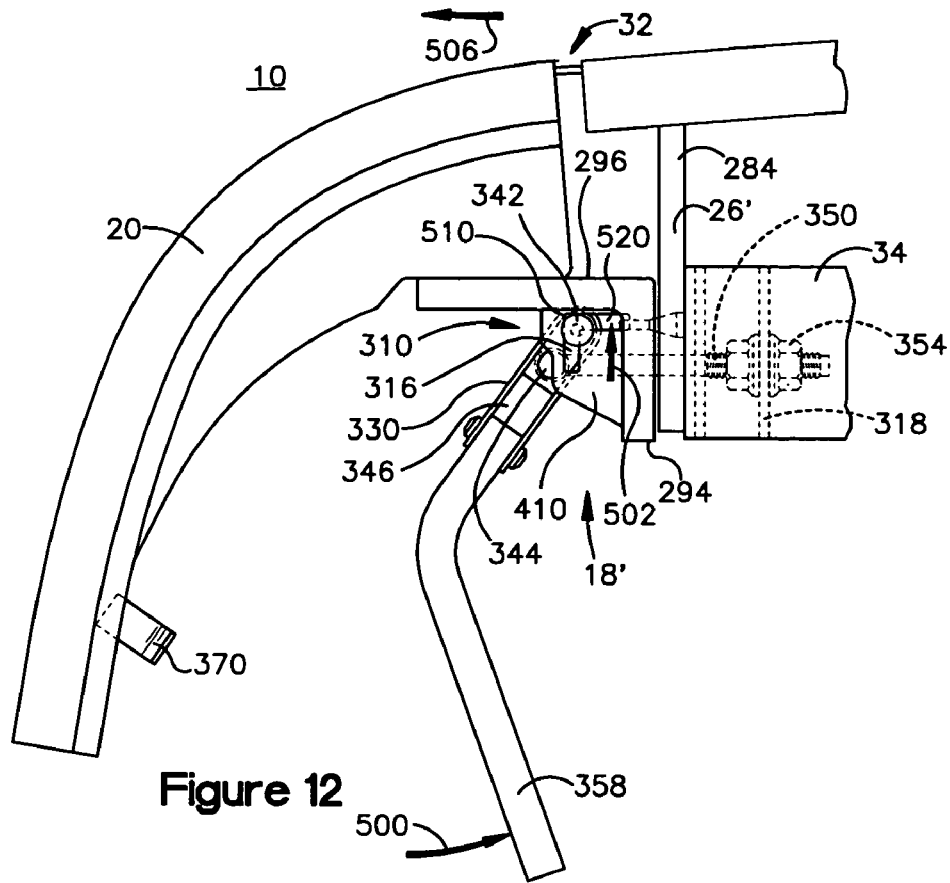
FIG. 12 is a view similar to the view of FIG. 10 showing detachment of an end bumper member from a center bumper member.
Figure 13:
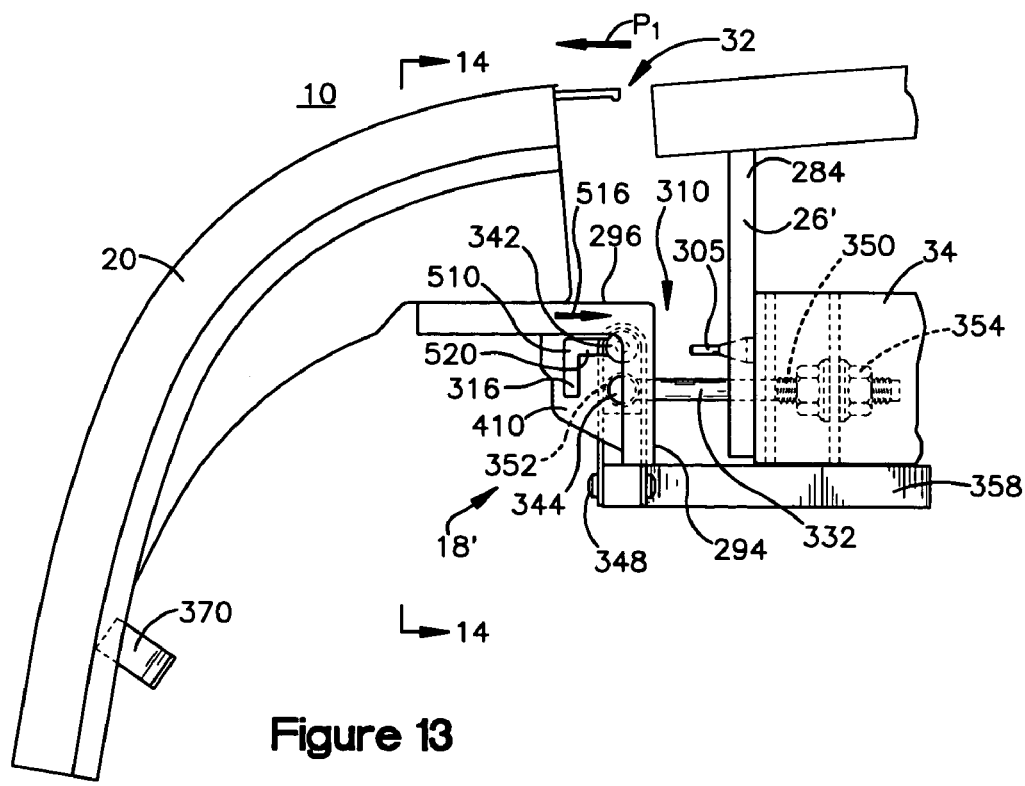
FIG. 13 is a view similar to the view of FIG. 12 showing separation of an end bumper member from a center bumper member.

In the embodiment illustrated by FIGS. 9–15, the mechanism allows movement along a path of travel between a normal or resting position (FIGS. 9, 11 and 14) and one or more positions that allow easier access to vehicle components (FIGS. 13 and 15). The normal position corresponds to the normal position of the bumper member during driving, where the end bumper member is aligned with and positioned at the end of the center bumper member. The mechanism 18' allows the end bumper member to be pulled apart from the center bumper member and to be rotated to a variety of positions where vehicle components normally shielded by the bumper are more accessible. In the example illustrated by FIG. 15, the bumper member 20 is in a position in which the bumper member extends in an inclined position in relation to a vertical plane.

Figure 14:
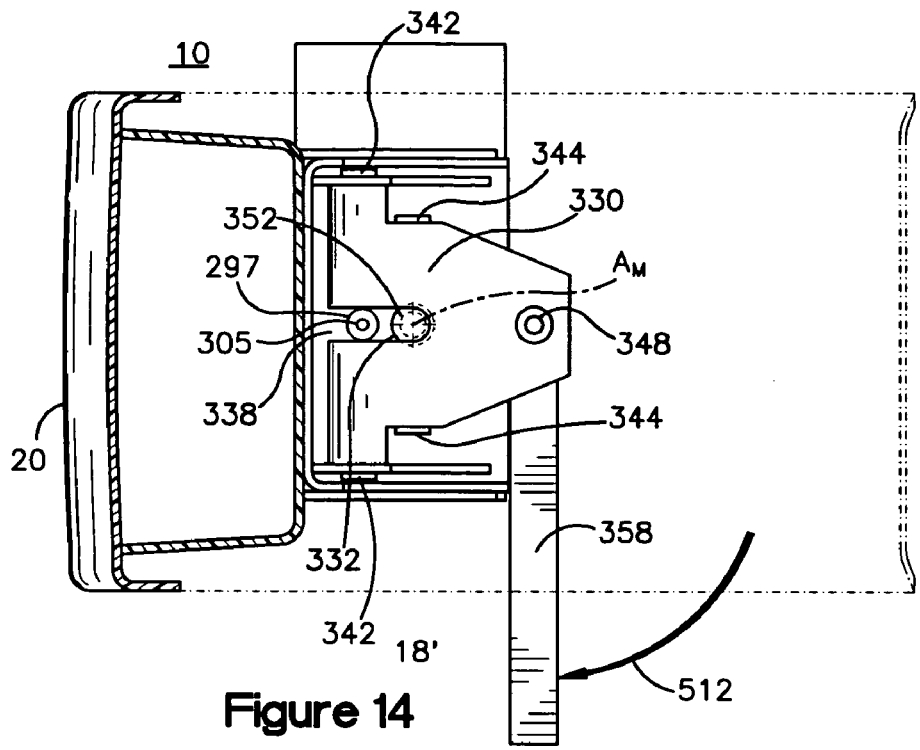
FIG. 14 is a view taken along the plane indicated by lines 14—14 in FIG. 13.

Referring to FIG. 9, in the normal position the latch 370 holds the handle 358 against the bumper member. In the normal position, the connecting rod pin 344 is positioned by the track following member 330 to apply a tensile force to the connecting rod. The connecting rod 332 pulls against the linkage connecting wall 318 of the biasing member 412, causing the biasing member to deflect slightly. The deflection of the biasing member 412 clamps the outer bracket 30' securely against inner bracket 26' in the normal position. Referring to FIGS. 9, 10 and 14, cooperation of the guide pin 305 and the guide pin hole 297 ensure that the outer bracket 30' is correctly oriented with respect to the inner bracket 26' in the normal position.

Referring to FIG. 12, movement of the end bumper member from the normal position is initiated by disengaging the handle from the latch 370 and rotating the handle 358 as indicated by arrow 500. Rotation of the handle 358 causes rotation of the following member 330 about the track following pins 342 and movement of the track following pins along the path defined by cutouts 316 as indicated by arrow 502. As the following member 330 rotates, the distance between the connecting rod pin 344 and the outer bracket flange 294 decreases. As a result, the deflection of the biasing member 412 is relieved and the outer bracket 30' if forced away from the inner bracket 26' by the connecting rod. As rotation of the handle 358 continues, the connection 32 begins to detach and the end bumper member begins to separate from the center bumper member as indicated by arrow 506. Further rotation of the handle moves the following pins 342 into a corner 510 of the path defining cutouts 316.

Referring to FIGS. 13 and 14, the handle may then be dropped down as indicated by arrow 512. The end bumper member is then pulled outward as indicated by arrow along the linear $P_1$ of the path of travel. As the end bumper member is pulled outward, the following pins 342 move with respect to the cutouts 316 as indicated by arrow 516. The end bumper member is pulled out as indicated by arrow $P_1$ until the guide pins reach an end 520 of the path defining cutouts. In this position, the guide pin 305 clears the outer bracket 30' and the connection 32 is completely detached. Referring to FIG. 15, the end bumper member may be rotated along the rotational portion $P_2$ of the travel path about the axis $A_m$ defined by the connecting rod 332. In the illustrated embodiment, the connecting rod 332 and the nuts 354 that connect the connecting rod to the biasing member 312 are rotatable with respect to the biasing member to allow the end bumper member to be rotated.

In the embodiment illustrated by FIGS. 9–15, the end bumper member is returned to its normal use position by rotating the end bumper member such that the guide pin is aligned with the guide pin hole and the latching projections 244 are aligned with the latching recesses 246 (FIG. 14.). The end bumper member is pushed inward until the following pins 342 reach the corner of the path defining cutouts. The handle is then lifted up and rotated back to the inner surface of the end bumper member to move the following pins back to the beginning of the path defining cutouts and to clamp the outer bracket 30' against the inner bracket. Once in the normal position, the handle is clamped to the inner surface of the end bumper member.

Although the present invention has been described with a degree of particularity, it is the intent that the invention include all the modifications and alterations falling within the spirit and scope of the appended claims.

The invention claimed is:

1. A moveable bumper arrangement, comprising:
    a) an elongated center bumper member;
    b) a first end bumper member and a second end bumper member mounted at opposite ends of the center bumper member; and
    c) a mechanism coupled to at least one of said first end bumper member and said second end bumper member that allows substantially translational movement of the at least one end bumper member with respect to the elongated center bumper member from a first position where the at least one end bumper member is positioned at an end of the elongated center bumper member to a second position where the at least one end bumper member is spaced apart from the elongated center bumper member, and allows rotation of the at least one end bumper member relative to the center bumper member.

2. The bumper arrangement of claim 1 wherein the mechanism allows the at least one end bumper member to be rotated with respect to the elongated center bumper member when the at least one end bumper member is spaced apart from the elongated center bumper member.

3. The bumper arrangement of claim 1 wherein the elongated center bumper member and the at least one end bumper member are connected by a detachable connection in the first position and movement to the second position detaches the detachable connection.

4. The bumper arrangement of claim 3 wherein the mechanism allows the at least one end bumper member to rotate with respect to the elongated center bumper member when the at least one end bumper member is detached from the elongated center bumper member.

5. The bumper arrangement of claim 3 wherein the detachable connection comprises a latching projection extending from the at least one end bumper member and a latching recess of the elongated center bumper member that accepts the latching projection, wherein the at least one end bumper member is latched to the elongated center bumper member when the latching projection is latched to the latching recess.

6. The bumper arrangement of claim 1 wherein the first end bumper member and second end bumper member are rotatable and linearly movable with respect to the elongated center bumper member.

7. A vehicle including a moveable bumper arrangement, comprising:
   a) a vehicle frame;
   b) a center bumper element mounted to the vehicle frame at a front end of the vehicle;
   b) a mechanism attached to the vehicle frame at the front end of the vehicle; and
   c) a bumper member connected to the vehicle frame at an end of the center bumper element by the mechanism, the bumper member comprising a front portion extending laterally from the center bumper element and a side portion extending along a side of the vehicle, wherein the mechanism allows substantially translational movement of the bumper member with respect to the center bumper element along a portion of a path of travel allowed by the mechanism to separate the bumper member from the center bumper element and allows rotation of the bumper member relative to the center bumper element.

8. The vehicle of claim 7 wherein the mechanism allows rotational movement of the bumper member after the bumper member is separated from the center bumper element.

9. The vehicle of claim 7 further comprising a hood that is separately movable from the bumper member.

10. The vehicle of claim 7 wherein an axis of rotation of the bumper member is substantially parallel to an axis of a vehicle wheel.

11. The vehicle of claim 7, wherein the mechanism allows both relative translational and rotational movement of the bumper member when the bumper member is separated from the center bumper element.

12. The vehicle of claim 7 further comprising a clamp arrangement for clamping the bumper member in a normal position.

13. The vehicle of claim 7 wherein the bumper arrangement further comprises a detachable connection between the bumper member and the center bumper element.

14. The vehicle of claim 13 wherein the detachable connection comprises a latching projection extending from the bumper member and a latching recess of the center bumper element that accepts the latching projection, wherein the bumper member is latched to said center bumper element when the latching projection is latched to the latching recess.

15. The vehicle of claim 13 wherein the mechanism allows the bumper member to be rotated after the bumper member is detached from the center bumper element.

16. The vehicle of claim 7 further comprising a handle coupled to the mechanism, wherein movement of the handle allows movement of the bumper member along the path of travel.

17. The vehicle of claim 7 wherein the mechanism includes a first mechanism member that cooperates with a second mechanism member such that the first mechanism member is rotatable and linearly movable with respect to the second mechanism member.

18. The vehicle of claim 17 wherein the first and second mechanism members include cooperating arcuate surfaces.

19. The vehicle of claim 13, wherein the mechanism allows simultaneous rotational and translational movement of the bumper member after the bumper member is detached from the center bumper element.

20. The vehicle of claim 17 wherein a pin extends from the first mechanism member and a slot is defined in the second mechanism member, wherein movement of the pin in the slot defines a portion of an allowed path of travel.

21. A method of moving a first bumper member with respect to a second bumper member from a normal position to an open position for servicing a vehicle, comprising the steps of: translating the first bumper member with respect to the second bumper member along a path of travel that includes a linear portion allowed by a mechanism that connects the first bumper member and a vehicle component, and rotating the first bumper member with respect to the second bumper member, wherein access is provided in the open position to at least one vehicle component behind the first bumper member in the normal position.

22. The method of claim 21 further comprising detaching the first bumper member from the second bumper member.

23. The method of claim 22 wherein translational movement of the first bumper member detaches the first bumper member from the second bumper member.

24. The method of claim 23 wherein the first bumper member is rotated with respect to the second bumper member after the first bumper member is detached from the second bumper member.

25. The method of claim 21 further comprising releasing a clamp arrangement that holds the first bumper member in a normal position.

26. The method of claim 22 wherein the detaching a connection comprises unlatching a projection from a latching recess.

27. The method of claim 21 further releasing a latch arrangement to allow movement along said path of travel.

28. The method of claim wherein 22 the first bumper member is simultaneously rotated and translated with respect to the second bumper member after the first bumper member is detached from the second bumper member.

29. The method of claim 22 wherein separating the first bumper member from the second bumper member comprises detaching a connection between the first bumper member and a second bumper member and moving the first bumper member away from the second bumper member.

30. A vehicle including a moveable bumper arrangement, comprising:
   a) a vehicle frame defining a front end and sides;
   b) a center bumper member connected to a frame of the vehicle at the front end;
   c) end bumper members connected to the frame at opposite ends of the center bumper member, the end bumper members having front portions and side portions capping the ends of the center bumper member to extend over a portion of the front end and a portion of the sides of the vehicle; and, c) a mechanism attached to the frame and supporting at least one end bumper member, the mechanism allowing translational movement of at least one end bumper member with respect to the center bumper member along a portion of a path of travel allowed by the mechanism and wherein the substantially translational movement of the at least one end bumper member separates the at least one end bumper member from the center bumper member and allowing rotational movement of the at least one end bumper member relative to the center bumper member displacing the side portion of the at least one end bumper member from the portion of the side of the vehicle.

* * * * *